(12) United States Patent
Inotaev et al.

(10) Patent No.: US 10,474,070 B2
(45) Date of Patent: Nov. 12, 2019

(54) LIQUID ELECTROPHOTOGRAPHIC PRINTING APPARATUS AND INTERMEDIATE TRANSFER MEMBERS

(71) Applicant: HP Indigo B.V., Amstelveen (NL)

(72) Inventors: Sergey Inotaev, Nes Ziona (IL); Raia Slivniak, Lod (IL); Ido Finkelman, Nes Ziona (IL); Dima Libster, Nes Ziona (IL); Eran Shiran, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/072,158

(22) PCT Filed: Apr. 18, 2016

(86) PCT No.: PCT/EP2016/058571
§ 371 (c)(1),
(2) Date: Jul. 23, 2018

(87) PCT Pub. No.: WO2017/182054
PCT Pub. Date: Oct. 26, 2017

(65) Prior Publication Data
US 2019/0033756 A1    Jan. 31, 2019

(51) Int. Cl.
*G03G 15/20* (2006.01)
*G03G 15/16* (2006.01)
(Continued)

(52) U.S. Cl.
CPC ......... *G03G 15/162* (2013.01); *B32B 25/042* (2013.01); *B32B 27/40* (2013.01);
(Continued)

(58) Field of Classification Search
CPC .... G03G 15/142; G03G 15/162; G03G 5/056; G03G 5/14752; G03G 2215/957
(Continued)

(56) References Cited

U.S. PATENT DOCUMENTS 5,715,510 A * 2/1998 Kusaba ............. G03G 5/14726
                                                 399/302
5,890,045 A * 3/1999 Till ..................... G03G 15/161
                                                 399/297
(Continued)

FOREIGN PATENT DOCUMENTS

EP         2523050          11/2012
WO    WO-2011021061          2/2011
(Continued)

OTHER PUBLICATIONS

BASF datasheet, General Productinformation, "Elastollan® S 60 A 15 SPF 000", 2015, Version 2, BASF, DE.
(Continued)

*Primary Examiner* — Hoan H Tran
(74) *Attorney, Agent, or Firm* — Dierker & Kavanaugh PC

(57) ABSTRACT

Herein is disclosed an intermediate transfer member for liquid electrophotographic printing. The intermediate transfer member may include at least one layer including a thermoplastic polyurethane. A liquid electrophotographic printer and a method of forming an intermediate transfer member are also described.

11 Claims, 6 Drawing Sheets

(51) Int. Cl.
  *G03G 15/10* (2006.01)
  *B32B 25/04* (2006.01)
  *B32B 27/40* (2006.01)
(52) U.S. Cl.
  CPC ............ *G03G 15/10* (2013.01); *G03G 15/161* (2013.01); *B32B 2274/00* (2013.01); *B32B 2375/00* (2013.01)
(58) Field of Classification Search
  USPC .................... 399/121, 162, 297, 302, 308
  See application file for complete search history.

(56) References Cited

U.S. PATENT DOCUMENTS

| | | | |
|---|---|---|---|
| 5,905,133 | A | 5/1999 | Mueller et al. |
| 7,106,997 | B2 | 9/2006 | Stulc et al. |
| 8,041,275 | B2 | 10/2011 | Soria et al. |
| 2005/0249530 | A1 | 11/2005 | McLean et al. |
| 2007/0009817 | A1 | 1/2007 | Kim |
| 2008/0038566 | A1 | 2/2008 | Cody et al. |
| 2008/0070042 | A1 | 3/2008 | Byers et al. |
| 2009/0067894 | A1 | 3/2009 | Yamada et al. |
| 2011/0168043 | A1 | 7/2011 | Meltzer et al. |
| 2012/0294658 | A1 | 11/2012 | Aoki et al. |
| 2015/0024648 | A1 | 1/2015 | Landa et al. |

FOREIGN PATENT DOCUMENTS

| | | |
|---|---|---|
| WO | WO-2012121702 | 9/2012 |
| WO | WO-2013060377 | 5/2013 |
| WO | WO-2013130083 | 9/2013 |
| WO | WO-2013130084 | 9/2013 |
| WO | WO-2013151182 | 10/2013 |
| WO | WO-2014075987 | 5/2014 |
| WO | WO-2016066232 | 5/2016 |
| WO | WO-2016066233 | 5/2016 |
| WO | WO-2016169624 | 10/2016 |

OTHER PUBLICATIONS

BASF datasheet, General Productinformation, "Elastollan® soft 35 A 12 P 000", 2015, Version 2, BASF, DE.
BASF datasheet, General Productinformation, "Elastollan® soft 45 A 12 P 000", 2015, Version 2, BASF, DE.
Dow Corning datasheet, Product Information, "TPSiV® 4200-60A Thermoplastic Elastomer", May 10, 2013, Dow Corning Corporation.
Dow Corning datasheet, Product Information, "TPSiV® 4200-70A Thermoplastic Elastomer", Dow Corning Corporation.
International Search Report and Written Opinion for International Publication No. PCT/EP2016/058571 dated Jun. 16, 2016, 12 pages.
OGBSA datasheet, "Polyurethane Rubber (AU-EU)".
Wikipedia web page, "Thermoplastic polyurethane", Mar. 29, 2016, (http://en.wikipedia.org/wiki/Thermoplastic_polyurethane), 4 pages.

* cited by examiner

LIQUID ELECTROPHOTOGRAPHIC PRINTING APPARATUS AND INTERMEDIATE TRANSFER MEMBERS

Liquid electrophotographic printing processes typically involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrophotographic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, in some examples, by being first transferred to an intermediate transfer member, which can be a soft swelling blanket, and then to the print substrate.

DETAILED DESCRIPTION

Figure 1:
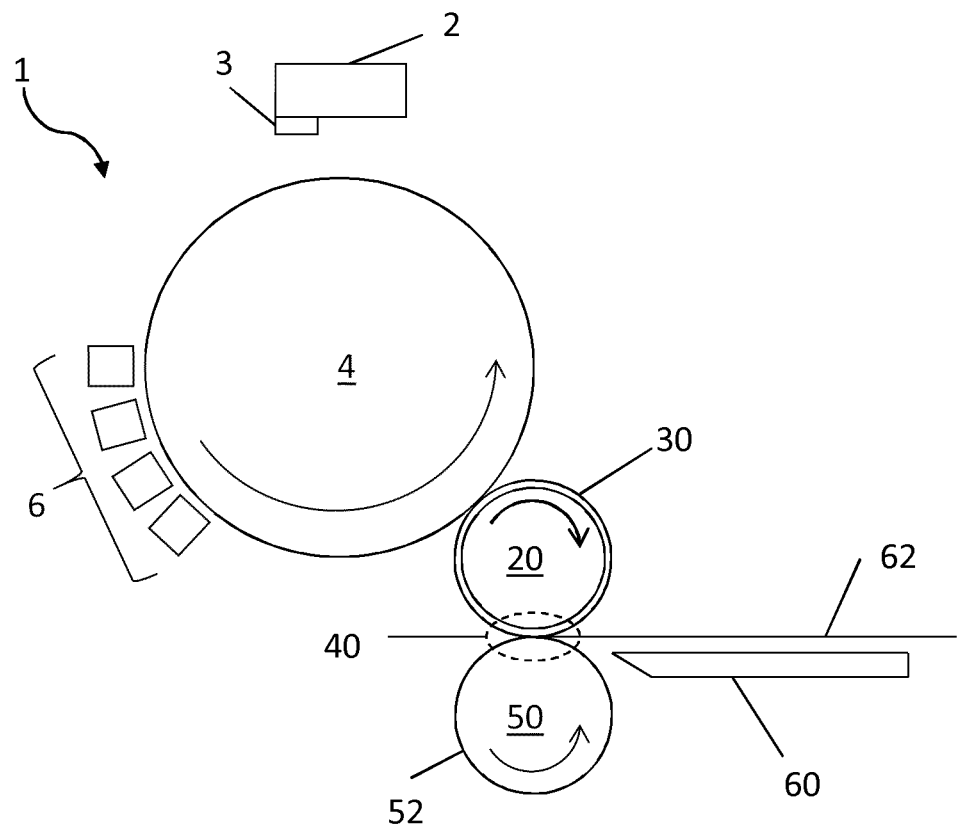
FIG. 1 is a schematic illustration of an example of a liquid electrophotographic printing apparatus.

Before the liquid electrophotographic printing apparatus, intermediate transfer members and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrophotographic ink or electrostatic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrophotographic ink composition" generally refers to an ink composition that is typically suitable for use in an electrophotographic printing process, sometimes termed an electrostatic printing process. The electrophotographic ink composition may include chargeable particles of the resin and the pigment dispersed in a liquid carrier, which may be as described herein.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrophotographic printing" or "electrostatic printing" generally refers to the process that provides an image that is transferred from a photoimaging plate either directly, or indirectly via an intermediate transfer member, to a print substrate. As such, the image is not substantially absorbed into the photoimaging plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g., an electric field having a field gradient of 1000 V/cm or more, or in some examples 1500 V/cm or more.

As used herein, a "conductive layer" or "top conductive layer" may refer to a layer comprising electrically conductive particles.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided an intermediate transfer member for liquid electrophotographic printing. The intermediate transfer member may comprise a thermoplastic polyurethane.

In an aspect, there is also provided an electrophotographic printer. The electrophotographic printer may have a photoimaging plate and an intermediate transfer member comprising at least one layer comprising a thermoplastic polyurethane, the intermediate transfer member being, in use, to transfer electrophotographic ink from the photoimaging plate to a print substrate.

In a further aspect, there is provided a method of forming an intermediate transfer member for liquid electrophotographic printing, the method comprising associating a plurality of layers to form the intermediate transfer member, at least one of the layers comprising a thermoplastic polyurethane.

Some methods of producing intermediate transfer members in the prior art require using a solvent. For example, such methods may involve depositing and/or curing a material in a solution, possibly while evaporating the solvent from the solution. This can be an expensive process, involving considerable labor and it can be time-consuming. Additionally, in some prior art intermediate transfer members, the compressible layers eventually suffer permanent plastic damage, as result of compression or impact, which then leads to poor print quality. Additionally, some prior art intermediate transfer members have release layers, which may, for example comprise silicone, that have a limited lifespan, since they degrade over time with repeated swelling (on contact with the carrier liquid of electrophotographic inks) and drying (after a print run). Examples of the intermediate transfer members can increase the lifespan of the ITM by addressing one or more of the difficulties mentioned above and can be applied using a simple, quick application method. The use of thermoplastic polyurethane has been found to reduce permanent deformation of an intermediate transfer member and has good recovery from mechanical impact. The thermoplastic polyurethane can be used as an inner layer on the intermediate transfer member or as a release layer or both.

Thermoplastic Polyurethane

A thermoplastic material in the present context indicates a material that can become mouldable, pliable or molten when heated to an appropriate temperature from a solid state, and then solidified on cooling, and the process repeated. The thermoplastic polyurethane described herein is not typically cross-linked. Thermoplastic materials are to be distinguished from thermoset materials, in which the solid materials are formed irreversibly (often 'cured') from a liquid state, typically by crosslinking in a polymer network. Thermoplastic polyurethanes are a class of polyurethane plastics comprising linear segmented block copolymers, which may have hard and soft segments. Thermoplastic polyurethane polymers may be formed by the reaction of three components: diisocyanates, long-chain diols (for example, polyesters polyols, polyether polyols or polycaprolactones), which may, for example, have a molecular weight of from at least 500 Daltons and so-called chain extenders (which may be short-chain diols, e.g. having a molecular weight of 400 Daltons or less). The thermoplastic polyurethane may be a polyester polyurethane. Polyester polyurethanes have been found to be particularly effective in the intermediate transfer member as described herein.

Long-chain Diols

The long-chain diol may be polyester polyols, polyether polyols or polycaprolactones, or combinations thereof. In some examples, the long-chain diol may comprise a combination of polyethers and polyesters.

In some examples, the long-chain diols are polyether polyols. In some examples, the polyether polyol may comprise a poly(oxypropylene) diol or a poly(oxytetramethylene) diol.

In some examples, the long-chain diols are polyester polyols.

The polyester polyol may be formed from at least one dialkylene glycol and at least one dicarboxylic acid, or an ester or anhydride thereof. The polyester polyol may contain 2 terminal hydroxyl groups, optionally, 2 primary hydroxyl groups, or the polyester polyol may include at least one terminal hydroxyl group, and in some embodiments, at least one terminal hydroxyl group and one or more carboxylic acid groups. The polyester polyol may be a substantially linear, or linear, polyester, which may have a number average molecular weight (Mn) in the range of from about 500 to about 10,000, from about 600 to about 4000, from about 600 to about 3000, from about 800 to about 3000, from about 1000 to about 2500, or from about 1200 to about 2500. In some examples, the polyester polyol will have a number average molecular weight in the range of from about 1500 to about 2500.

The polyester polyol may be an adipate, a polycaprolactone, a polycarbonate or an aliphatic polycarbonate.

The Diisocyanate

The diisocyanates may be selected from: (i) aromatic diisocyanates, such as, 4,4'-methylenebis-(phenyl isocyanate) (MDI), m-xylylene diisocyanate (XDI), phenylene-1, 4-diisocyanate, 1,5-naphthalene diisocyanate, diphenylmethane-3,3'-dimethoxy-4,4'-diisocyanate (TODI), and toluene diisocyanate (TDI); or (ii) aliphatic diisocyanates, such as, isophorone diisocyanate (IPDI), 1,4-cyclohexyl diisocyanate (CHDI), decane-1,10-diisocyanate, hexamethylene diisocyanate (HDI), bis(isocynanatomethyl)cyclohexane (CHMDI) and dicyclohexylmethane-4,4'-diisocyanate (HMDI). In some examples, the diisocyanate is 4,4'-methylenebis(phenyl isocyanate) (MDI). In other examples, one or more of the diisocyanates listed are excluded.

The Chain Extender

The third reactant used in synthesizing TPU is a so-called chain extender, which may be a short-chain diol. The chain extender may have a molecular weight in the range of from 48 to about 400 or from 61 to about 400.

Suitable chain extenders include glycols and can be aliphatic, aromatic or combinations thereof. In some cases, the chain extenders are glycols having from 2 to about 20 carbon atoms. In some examples, the glycol chain extenders are lower aliphatic or short-chain glycols having from about 4 to about 12 carbon atoms and include, for example, diethylene glycol, dipropylene glycol, 1,4-butane diol, 1,6-hexanediol, 1,3-butanediol, 1,5-pentanediol, 1,4-cyclohexanedimethanol, neopentyglycol, 1,9-nonanediol, 1,12-dodecanediol and the like. In some embodiments, the chain extender is comprised solely of 1,6-hexanediol.

In some examples, the chain extender may comprises an aromatic glycol. In some examples, the aromatic glycol may be benzene glycol or xylene glycol. Xylene glycol may be a mixture of 1,4-di(hydroxymethyl)benzene and 1,2-di(hydroxymethyl)benzene. The benzene glycol may be hydroquinone bis(betahydroxyethyl)ether (HQEE), 1,3-di(2-hydroxyethyl)benzene, 1,2-di(2-hydroxyethoxy)benzene, or combinations thereof.

Diamines may also be used as a chain extender.

Suitable TPUs are available commercially, e.g. in the Elastollan® range of from BASF (e.g. soft 35 A 12 P 000, soft 45 A 12 P 000, and S 60 A 15 SPF 000).

The TPU may comprise particles of a silicone therein, preferably a cross-linked silicone rubber. This type of TPU is particularly useful as outer release layer of an ITM. This type of TPU is available commercially, e.g. TPSiV® 4200-60A Thermoplastic Elastomer and TPSiV® 4200-70A Thermoplastic Elastomer, both from Dow Corning. diisocyanate The TPU may have a Shore A hardness value of less than about 80, less than about 75, less than about 70, less than about 65, or less than or equal to about 60. The TPU may have a Shore A hardness value of greater than about 20, greater than about 30, greater than about 40 or greater than about 50. The Shore A hardness value is measured by ASTM D-2240 or DIN ISO 7619-1 (3s) or ISO 868.

Liquid Electrophotographic (LEP) Printing Apparatus

FIG. 1 shows a schematic illustration of an example of an LEP printing apparatus 1 and the use of an intermediate transfer member therein. An image, including any combination of graphics, text and images, is communicated to the LEP printing apparatus 1. The LEP printing apparatus includes a photo charging unit 2 and a photo-imaging cylinder 4. The image is initially formed on a photoimaging plate (also known as a photoconductive member), in this case in the form of a photo-imaging cylinder 4, before being transferred to an outer release layer 30 of the intermediate transfer member (ITM) 20 which is in the form of a roller (first transfer), and then from the outer release layer 30 of the ITM 20 to a print substrate 62 (second transfer).

According to an illustrative example, the initial image is formed on a rotating photo-imaging cylinder 4 by the photo charging unit 2. Firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. Liquid electrophotographic ink is then transferred to the photo-imaging cylinder 4 by binary ink developer (BID) units 6. The BID units 6 present a uniform film of liquid electrophotographic ink to the photo-imaging cylinder 4. The liquid electrophotographic ink contains electrically charged pigment particles which, by virtue of an appropriate potential on the electrostatic image areas, are attracted to the latent electrostatic image on the photo-imaging cylinder 4. The liquid electrophotographic ink does not adhere to the uncharged, non-image areas and forms a developed toner image on the surface of the latent electrostatic image. The photo-imaging cylinder 4 then has a single colour ink image on its surface.

The developed toner image is then transferred from the photo-imaging cylinder 4 to the outer release layer 30 of the ITM 20 by electrical forces. The image is then dried and fused on the outer release layer 30 of the ITM 20 before being transferred from the outer release layer 30 of the ITM 20 to a print substrate disposed on impression cylinder 50. The process may then be repeated for each of the coloured ink layers to be included in the final image.

The image is transferred from the photo-imaging cylinder 4 to the ITM 20 by virtue of an appropriate potential applied between the photo-imaging cylinder 4 and the ITM 20, such that the charged ink is attracted to the ITM 20.

Between the first and second transfers, the solid content of the developed toner image is increased and the ink is fused on to the ITM 20. For example, the solid content of the developed toner image deposited on the outer release layer 30 after the first transfer is typically around 20%, by the second transfer the solid content of the developed toner image is typically around 80-90%. This drying and fusing is typically achieved by using elevated temperatures and air-flow-assisted drying. In some examples, the ITM 20 is heatable.

The print substrate 62 is fed into the printing apparatus by the print substrate feed tray 60 and is disposed on the impression cylinder 50. As the print substrate 62 contacts the ITM 20, the single colour image is transferred to the print substrate 62.

To form a single colour image (such as a black and white image), one pass of the print substrate 62 through the impression cylinder 50 and the ITM 20 completes the image. For a multiple colour image, the print substrate 62 is retained on the impression cylinder 50 and makes multiple contacts with the ITM 20 as it passes through the nip 40. At each contact an additional colour plane may be placed on the print substrate 62.

Intermediate Transfer Member

The intermediate transfer member may be termed an ITM herein for brevity. The ITM may comprise a supportive portion on which an outer release layer is disposed. The supportive portion and/or the outer release layer may comprise a layer comprising a thermoplastic polyurethane. The ITM may have a base, for example a metal base. The base may have a cylindrical shape. The base may form part of the supportive portion of the ITM.

The ITM may have a cylindrical shape, as such the ITM may be suitable for use as a roller, for example a roller in a printing apparatus.

The supportive portion of the ITM may comprise a layered structure disposed on the base of the ITM. The layered structure may comprise a compliant substrate layer, for example, a rubber layer or a layer comprising a thermoplastic polyurethane, on which the outer release layer may be disposed.

The compliant substrate layer may comprise a thermoplastic polyurethane. The compliant substrate layer may comprise a rubber layer comprising an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ or FLS), a fluorocarbon rubber (FKM or FPM) or a perfluorocarbon rubber (FFKM).

The ITM may comprise a primer layer to facilitate bonding or joining of the release layer to the compliant layer. The primer layer may form part of the supportive portion of the ITM, in some examples the primer layer is disposed on the compliant substrate layer. If the release layer comprises a thermoplastic polyurethane, the ITM may lack a primer layer.

In some examples, the primer layer may comprise an organosilane, for example, an organosilane derived from an epoxysilane such as 3-glycidoxypropyl trimethylsilane, a vinyl silane such as vinyltriethoxysilane, a vinyltriethoxysilane, an allyl silane, or an unsaturated silane, and a catalyst such as a catalyst comprising titanium or platinum.

The primer layer may be formed from a curable primer layer. The curable primer layer may be applied to the compliant substrate layer of the supportive portion of the ITM before the outer release layer is formed on the supportive portion. The curable primer layer may comprise an organosilane and a catalyst, for example a catalyst comprising titanium.

In some examples the organosilane contained in the curable primer layer is selected from an epoxysilane, a vinyl silane, an allyl silane and an unsaturated silane.

The curable primer layer may comprise a first primer and a first catalyst, and a second primer and, in some examples, a second catalyst. The first primer and/or the second primer may comprise an organosilane. The organosilane may be selected from an epoxysilane, a vinyl silane, an allyl silane and an unsaturated silane.

In some examples, the first catalyst is a catalyst for catalysing a condensation cure reaction, for example, a catalyst comprising titanium. The first primer may be cured by a condensation reaction by the first catalyst. The second primer may be cured by a condensation reaction by the first catalyst.

In some examples, the second catalyst is a catalyst for catalysing an addition cure reaction. In such cases, the second catalyst may catalyse an addition cure reaction of the pre-cure release composition to form the release layer.

The curable primer layer may be applied to the compliant layer as a composition containing the first and second primer and first and second catalyst.

In some examples the curable primer layer may be applied to the compliant layer as two separate compositions, one containing the first primer and first catalyst, the other containing the second primer and second catalyst.

In some examples, the ITM may comprise an adhesive layer for joining the compliant substrate layer to the base. The adhesive layer may be a fabric layer, for example a woven or non-woven cotton, synthetic, combined natural and synthetic, or treated, for example, treated to have improved heat resistance, material.

The compliant substrate layer may be formed of a plurality of compliant layers. For example, the compliant substrate layer may comprise a compressible layer, a compliance layer and/or a conductive layer. A "conductive layer" may be a layer comprising electrically conductive particles. In some examples, any one or more of the plurality of compliant layers may comprise a thermoplastic polyurethane.

In some examples, the compressible layer is disposed on the base of the ITM. The compressible layer may be joined to the base of the ITM by the adhesive layer. A conductive layer may be disposed on the compressible layer. The compliance layer may then be disposed on the conductive layer, if present, or disposed on the compressible layer if no conductive layer is present. If the compressible layer and/or the compliance layer are partially conducting there may be no requirement for an additional conductive layer.

The compressible layer may have a large degree of compressibility. In some examples, the compressible layer may be 600 µm thick.

The compressible layer may comprise a thermoplastic polyurethane. In some examples, the compressible layer may comprise a thermoplastic polyurethane. The compressible layer may be a rubber layer which, for example, may comprise an acrylic rubber (ACM), a nitrile rubber (NBR), a hydrogenated nitrile rubber (HNBR), a polyurethane elastomer (PU), an EPDM rubber (an ethylene propylene diene terpolymer), or a fluorosilicone rubber (FLS). In some examples, the compressible layer may comprise carbon black to increase its thermal conductivity.

In some examples, the compressible layer includes small voids, which may be as a result of microspheres or blowing agents used in the formation of the compressible layer. In some examples, the small voids comprise about 40 to about 60% by volume of the compressible layer.

The compliance layer may comprise a thermoplastic polyurethane. The compliance layer may comprise a soft elastomeric material having a Shore A hardness value of less than about 65, or a Shore A hardness value of less than about 55 and greater than about 35, or a Shore A hardness value of between about 42 and about 45. In some examples, the compliance layer 27 comprises a polyurethane, a thermoplastic polyurethane or an acrylic. Shore A hardness is determined by ASTM standard D2240.

In some examples, the compliance layer comprises an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ), a fluorocarbon rubber (FKM or FPM) or a perfluorocarbon rubber (FFKM). In some examples, the compliance layer comprises a thermoplastic polyurethane.

In an example the compressible layer and the compliance layer are formed from the same material.

The conductive layer may comprise a rubber, for example, an acrylic rubber (ACM), a nitrile rubber (NBR), a hydrogenated nitrile rubber (HNBR), or an EPDM rubber (an ethylene propylene diene terpolymer), and one or more conductive materials, including but not limited to carbon black or metallic particles. In some examples, the conductive layer may comprise a thermoplastic polyurethane and one or more conductive materials, including but not limited to carbon black or metallic particles.

In some examples, the compressible layer and/or the compliance layer may be made to be partially conducting with the addition of conducting particles, for example, conductive carbon black, metal particles or metal fibres. In some examples, where the compressible layer and/or the compliance layer are partially conducting there may be no requirement for an additional conductive layer.

In some examples, the intermediate transfer member comprises, in the following order:
  a. a fabric layer;
  b. a compressible layer, which may have voids therein;
  c. a layer comprising electrically conductive particles;
  d. an optional compliant layer; and
  e. an outer release layer;
  wherein at least one of the compressible layer, the layer comprising electrically conductive particles, the optional compliant layer, and the outer release layer comprises the layer comprises thermoplastic polyurethane, and the other layers may be as described herein. In some examples, the compliant layer is present, and the compliant layer; and the outer release layer both comprise a thermoplastic polyurethane, and the outer release layer further comprises particles of silicone dispersed in the thermoplastic polyurethane.

Figure 2:
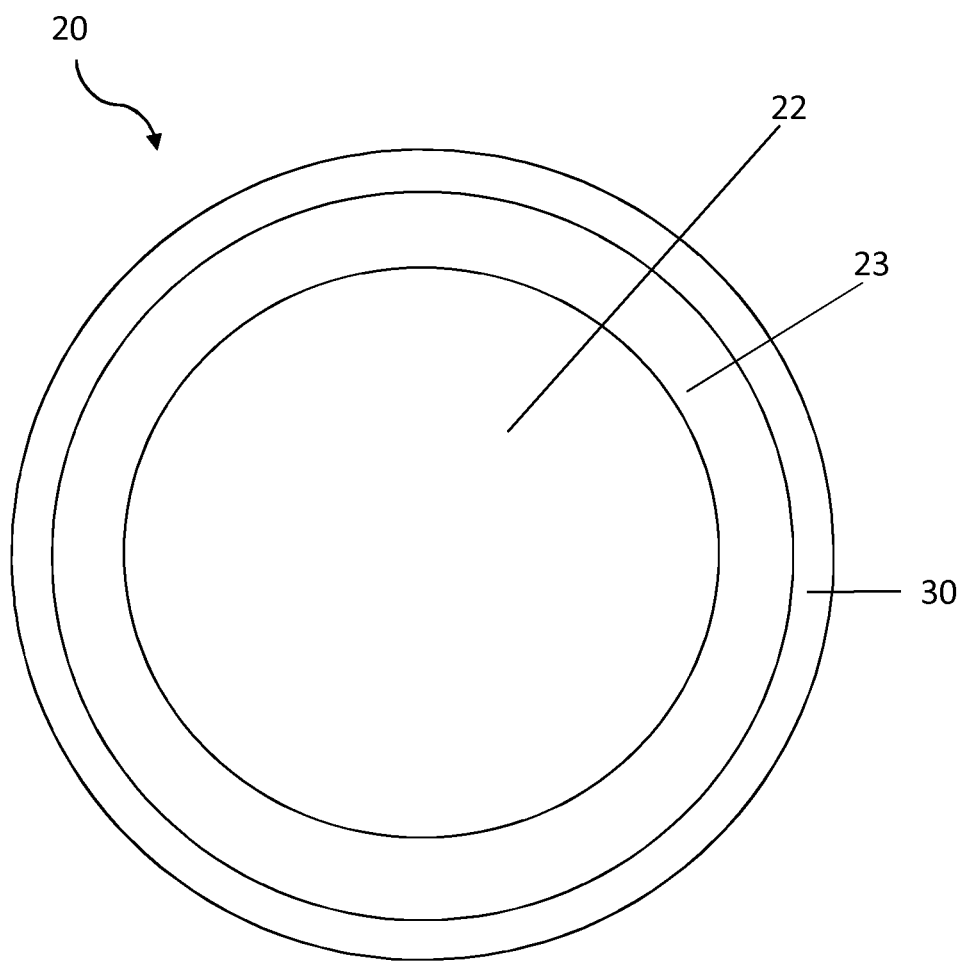
FIG. 2 is a cross-sectional diagram of an example of an intermediate transfer member (ITM).

FIG. 2 is a cross-sectional diagram of an example of an ITM. The ITM includes a supportive portion comprising a base 22 and a substrate layer 23 disposed on the base 22. The base 22 may be a metal cylinder. The substrate layer 23 may comprise or be a thermoplastic polyurethane layer. The ITM 20 also comprises an outer release layer 30 disposed on the substrate layer 23. The outer release layer 30 may comprise or be a thermoplastic polyurethane layer.

The substrate layer 23 may comprise or further comprise (if it also comprises a thermoplastic polyurethane layer) a rubber layer which may comprise an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ or FLS), a fluorocarbon rubber (FKM or FPM) or a perfluorocarbon rubber (FFKM). For example, the rubber layer may comprise an at least partly cured acrylic rubber, for example an acrylic rubber comprising a blend of acrylic resin Hi-Temp 4051 EP (Zeon Europe GmbH, Niederkasseler Lohweg 177, 40547 Düsseldorf, Germany) filled with carbon black pearls 130 (Cabot, Two Seaport Lane, Suite 1300, Boston, Mass. 02210, USA) and a curing system which may comprise, for example, NPC-50 accelerator (ammonium derivative from Zeon). The substrate layer 23 may comprise a thermoplastic polyurethane layer.

Figure 3:
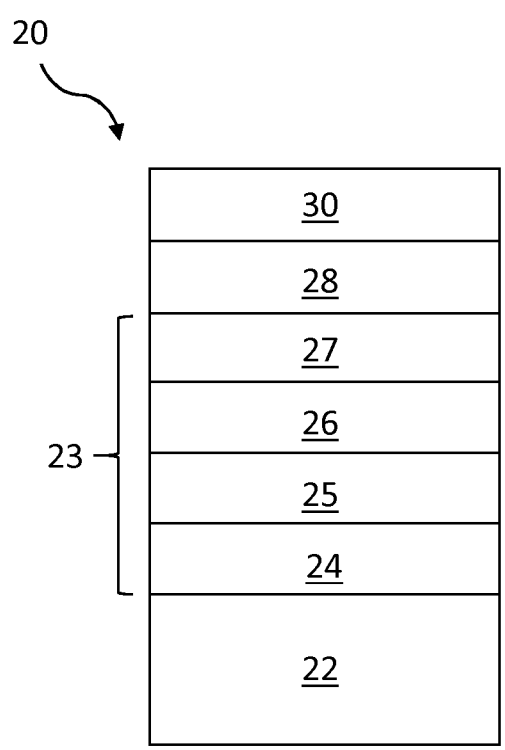
FIG. 3 is a schematic cross-sectional diagram of an example of an ITM structure.

FIG. 3 shows a cross-sectional view of an example of an ITM having a substrate layer 23 comprising an adhesive layer 24 disposed between the base 22 and a compressible layer 25 for joining the compressible layer 25 of the substrate layer 23 to the base 22, a conductive layer 26 may be disposed on the compressible layer 25, and a compliance layer 27 (also called a soft compliant layer) may be disposed on the conductive layer 26. A primer layer 28 is disposed between the substrate layer 23 and the outer release layer 30. At least one of the layers 24 to 27 and 30 may comprise a thermoplastic polyurethane.

Figure 4:
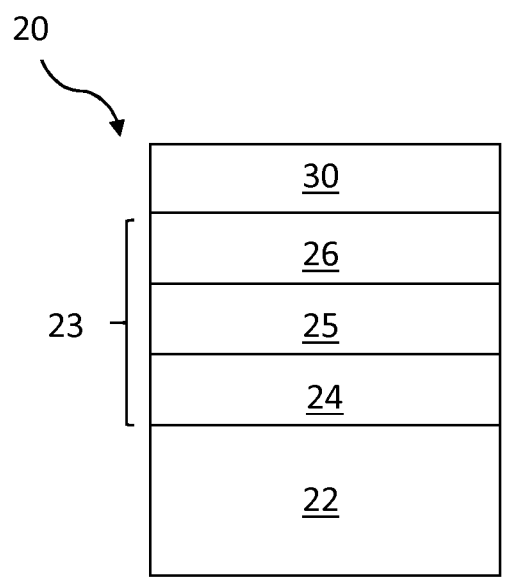
FIG. 4 is a schematic cross-sectional diagram of an example of an ITM structure, as described in Examples 1 and 4 below.

FIG. 4 shows a cross-sectional view of an ITM (for example, as described in Examples 1 and 4) having a substrate layer 23 comprising an adhesive layer 24 disposed between the base 22 and a compressible layer 25 for joining the compressible layer 25 of the substrate layer 23 to the base 22, a conductive layer 26 may be disposed on the compressible layer 25. The outer release layer 30 comprises a thermoplastic polyurethane layer.

Figure 5:
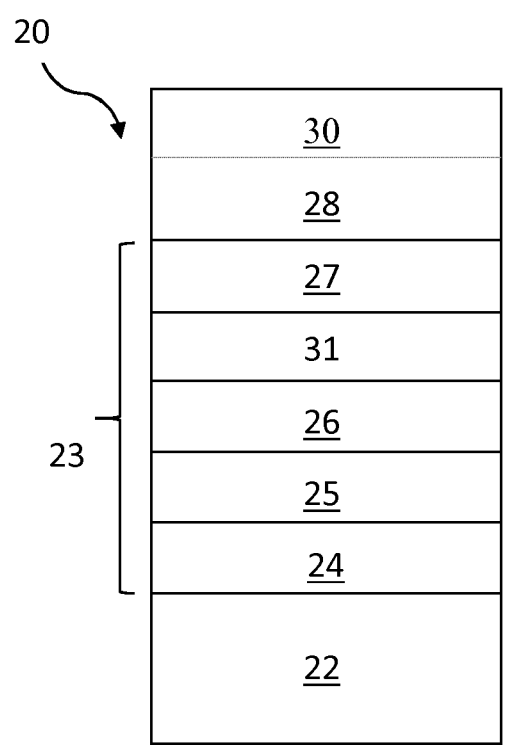
FIG. 5 is a schematic cross-sectional diagram of an example of an ITM structure, as described in Example 2 below.

FIG. 5 shows a cross-sectional view of an ITM (for example, as described in Example 2) having a substrate layer 23 comprising an adhesive layer 24 disposed between the base 22 and a compressible layer 25 for joining the compressible layer 25 of the substrate layer 23 to the base 22, a conductive layer 26 may be disposed on the compressible layer 25, a layer comprising a thermoplastic polyurethane 31 may be disposed on the conductive layer 26, and a compliance layer 27 (also called a soft compliant layer) may be disposed on the conductive layer 26. The outer release layer 30 may be disposed on a primer layer 28, which may be disposed on the compliance layer 27.

Figure 6:
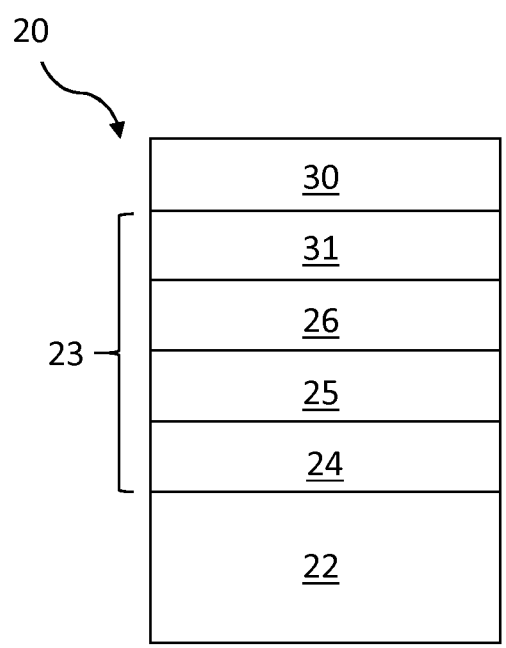
FIG. 6 is a schematic cross-sectional diagram of an example of an ITM structure, as described in Example 3 below.

FIG. 6 shows a cross-sectional view of an ITM (for example, as described in Example 3) having a substrate layer 23 comprising an adhesive layer 24 disposed between the base 22 and a compressible layer 25 for joining the compressible layer 25 of the substrate layer 23 to the base 22, and a conductive layer 26 may be disposed on the compressible layer 25, and a layer comprising a thermoplastic polyurethane 31 may be disposed on the conductive layer 26. The outer release layer 30, disposed on the layer comprising a thermoplastic polyurethane, may comprise a silicone dispersed within a thermoplastic polyurethane.

The adhesive layer may be a fabric layer, for example a woven or non-woven cotton, synthetic, combined natural and synthetic, or treated, for example, treated to have improved heat resistance, material. In an example the adhesive layer 23 is a fabric layer formed of NOMEX material having a thickness, for example, of about 200 μm.

The compressible layer 25 may be a rubber layer which, for example, may comprise an acrylic rubber (ACM), a nitrile rubber (NBR), a hydrogenated nitrile rubber (HNBR), a polyurethane elastomer (PU), an EPDM rubber (an ethylene propylene diene terpolymer), or a fluorosilicone rubber (FLS). The compressible layer may comprise a thermoplastic polyurethane.

The compliance layer 27 may comprise a soft elastomeric material having a Shore A hardness value of less than about 65, or a Shore A hardness value of less than about 55 and greater than about 35, or a Shore A hardness value of between about 42 and about 45. In some examples, the compliance layer 27 comprises a polyurethane or acrylic. In some examples, the compliance layer 27 comprises a thermoplastic polyurethane. Shore A hardness is determined by ASTM standard D2240. In some examples, the compliance layer comprises an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ), a fluorocarbon rubber (FKM or FPM) or a perfluorocarbon rubber (FFKM)

In an example, the compressible layer 25 and the compliance layer 27 are formed from the same material.

In some examples, the conductive layer 26 comprises a rubber, for example, an acrylic rubber (ACM), a nitrile rubber (NBR), a hydrogenated nitrile rubber (HNBR), or an EPDM rubber (an ethylene propylene diene terpolymer), and one or more conductive materials. In some examples, the conductive layer 26 comprises a thermoplastic polyurethane and one or more conductive materials. In some examples, the conductive layer 26 may be omitted, such as in some examples in which the compressible layer 25, the compliance layer 27, or the release layer 30 are partially conducting. For example, the compressible layer 25 and/or the compliance layer 27 may be made to be partially conducting with the addition of conductive carbon black or metal fibres.

The primer layer 28 may be provided to facilitate bonding or joining of the release layer 30 to the substrate layer 23. The primer layer 28 may comprise an organosilane, for example, an organosilane derived from an epoxysilane such as 3-glycidoxypropyl trimethylsilane, a vinyl silane such as vinyltriethoxysilane, a vinyltriethoxysilane, an allyl silane, or an unsaturated silane, and a catalyst such as a catalyst comprising titanium or platinum.

In an example, a curable primer layer 28 is applied to a compliance layer 27 of a substrate layer 23, for example, to the outer surface of a compliance layer 27 made from an acrylic rubber. The curable primer may be applied using a rod coating process. The curable primer may comprise a first primer comprising an organosilane and a first catalyst comprising titanium, for example an organic titanate or a titanium chelate. In an example the organosilane is an epoxysilane, for example, 3-glycidoxypropyl trimethoxysilane (available from ABCR GmbH & Co. KG, Im Schlehert 10 D-76187, Karlsruhe, Germany, product code SIG5840) and vinyltriethoxysilane (VTEO, available from Evonik, Kirschenallee, Darmstadt, 64293, Germany), vinyltriethoxysilane, an allyl silane or an unsaturated silane. The first primer is curable by, for example, a condensation reaction. For example, the first catalyst for a silane condensation reaction may be an organic titanate such as Tyzor® AA75 (available from Dorf-Ketal Chemicals India Private Limited Dorf Ketal Tower, D'Monte Street, Orlem, Malad (W), Mumbai-400064, Maharashtra INDIA.). The primer may also comprise a second primer comprising an organosilane, e.g., a vinyl siloxane, such as a vinyl silane, for example, vinyl triethoxy silane, vinyltriethoxysilane, an allyl silane or an unsaturated silane, and, in some examples, a second catalyst. The second primer may also be curable by a condensation reaction. The second catalyst, if present, may be different from the first catalyst and in some examples comprises platinum or rhodium. For example, the second catalyst may be a Karstedt catalyst with, for example, 9% platinum in solution (available from Johnson Matthey, 5th Floor, 25 Farringdon Street, London EC4A 4AB, United Kingdom) or a SIP6831.2 catalyst (available from Gelest, 11 East Steel Road, Morrisville, Pa. 19067, USA). This second primer may be cured by an addition reaction. The second catalyst in the second primer may be in contact with a pre-cure release composition applied onto the primer layer 28. In addition to catalysing the addition cure reaction of the second primer, the second catalyst may also catalyse the addition cure reaction of the pre-cure release composition to form the release layer 30.

The curable primer layer applied to the substrate layer 23 may comprise a first primer and/or a second primer. The curable primer layer may be applied to the substrate layer 23 as two separate layers, one layer containing the first primer and the other layer containing the second primer.

The rubbers of the compressible layer 25, the conductive layer 26 and/or the compliance layer 27 of the substrate layer 23 may be uncured when the curable primer layer is applied thereon.

The outer release layer 30 of the ITM 20 may be a polysiloxane that has been cross-linked using an addition cure process such that it contains Si—R—Si bonds, wherein R is an alkylene moiety, and a monoalkenylsiloxane has been reacted with and incorporated into the polysiloxane.

The outer release layer 30 may be formed on the ITM by applying a pre-cure release layer composition to a supportive portion of the ITM. For example, the outer release layer may be applied to the substrate layer 23 or on top of a curable primer layer which has already been applied to the substrate layer 23. The curable primer layer and the release layer may have been cured and cross-linked, respectively, at the same time.

The pre-cure release layer composition may comprise at least one silicone oil having alkene groups linked to the silicone chain of the silicone oil; a cross-linker comprising a silicon hydride component, and a monoalkenylsiloxane. In some examples, the pre-cure release composition may contain a catalyst, for example, a platinum-containing catalyst or a rhodium-containing catalyst.

In some examples, once cured, the ITM comprises an outer release layer 30 disposed on a substrate layer 23, or, if present, disposed on a primer layer 28.

In some examples, the silicone polymer matrix of the outer release layer 30 comprises the cross-linked product of the at least one silicone oil and the silicon hydride cross-linking component.

In some examples, the outer release layer 30 may comprise a thermoplastic polyurethane. In some examples, the outer release layer 30 may comprise a silicone dispersed within a thermoplastic polyurethane.

Method

The method of forming an intermediate transfer member may comprise associating a plurality of layers to form the intermediate transfer member, including at least one layer comprising a thermoplastic polyurethane. In some examples, the thermoplastic polyurethane may be applied to another layer in a molten or a tacky state at an appropriate temperature (e.g. a temperature of 120° C. or above)

In some examples, a layer comprising a thermoplastic polyurethane may be associated with another layer or a plurality of layers of the ITM, which may or may not comprise a thermoplastic polyurethane, by calendering or lamination. In some examples, the lamination may be heat lamination.

In some examples, the lamination or calendering is performed at a temperature at which the thermoplastic polyurethane is tacky but not melted. In some examples, the lamination or calendering temperature is below about 190° C., below about 175° C., below about 150° C., or below about 130° C. In some examples, the lamination or calendering temperature is above the temperature used in the LEP printing process. In some examples, the lamination or calendering temperature is above about 115° C., above about 118° C., or greater than or equal to about 120° C.

In some examples, the thermoplastic polyurethane layer is formed by extrusion as a thermoplastic polyurethane film. In some examples, the extrusion is performed in a pre-production step. In some examples, the thermoplastic polyurethane is extruded and then directly calendered onto another layer or plurality layers of the ITM.

In some examples, the extrusion of the thermoplastic polyurethane is performed at a higher temperature than the lamination or calendering. In some examples the extrusion is performed at a temperature of greater than 130° C., greater than 150° C., greater than 175° C. or greater than 190° C.

EXAMPLES

The following Examples illustrate a number of variations of intermediate transfer members. However, it is to be understood that the following are only examples or illustrative of the application of the principles of the present printing apparatus, intermediate transfer member and related aspects. Numerous modifications and alternative intermediate transfer members may be made without departing from the spirit and scope of the printing apparatus, intermediate transfer member and related aspects. The appended claims are intended to cover such modifications and arrangements. Thus, while the present methods and related aspects have been described above with particularity, the following examples provide further detail in connection with what are presently deemed to be acceptable.

Reference ITM (Blanket) Structure

The blanket structure from bottom to top (top is a release layer; bottom is a layer which is in contact with a metal ITM drum):

1. Fabric based (in these examples: cotton or cotton/rayon) adhesive layer having a thickness of less than 250 μm;
2. Rubber based compressible layer with large range of compressibility and having voids therein (in these examples, NBR containing carbon black (CB)) having a thickness of 600-700 μm;
3. Rubber based conductive layer (in these examples: NBR containing CB from ContiTech or ACM containing CB from Trelleborg) having a thickness of 140-300 μm;
4. Rubber based soft compliant layer (in these examples: ACM containing CB from ContiTech or ACM containing CB from Trelleborg) having a thickness of 80-160 μm;
5. Primer layer may comprise a one or more portions (coated on substrate (rubber layer no 4) formed layer by layer. The primer formulation is described in table 1, below.

6. Release layer as described in table 2, below

TABLE 1

| Materials of primer | % in formulation | Supplier |
|---|---|---|
| 3Glycidoxypropyl) trimethoxysilane | 52 | ABCR |
| Vinyltrimethoxysilane | 35 | ABCR |
| Tyzor AA75 | 10 | Dorf Ketal |
| Karstedt solution 9% Pt | 3 | Johnson Matthey |

TABLE 2

| Materials | Parts by weight in formulation | Dynamic Viscosity (mPa · s) | Functional group content | Supplier |
|---|---|---|---|---|
| Dimethylsiloxane vinyl terminated (vs500) | 80 | 500 | 0.14 Vinyl (mmole/g) | ABCR |
| Vinylmethylsiloxane - Dimethylsiloxane Copolymer vinyl terminated (xprv5000) | 20 | 3000 | 0.4 Vinyl (mmole/g) | |
| Hydride siloxane Crosslinker 210 | 14 | 900 | 4.2 SiH (mmole/g) | ABCR |
| Inhibitor 600 | 5 | 900 | 0.11 Vinyl (mmole/g) | |
| Karstedt solution 0.5% Pt | 0.5 | 500 | 0.14 Vinyl (mmole/g) | ABCR |

*Viscosities given in the table above were measured by using a Brookfield DV-II + Programmable Viscometer, spindle LV-4 (SP 64) 200-1,000 [mPa · s] for Newtonian fluids (pure silicones) and spindle LV-3 (SP 63).

An ITM comprising a metal drum and layers 1 to 4 mentioned above was coated with a primer layer (no. 5 above) and then the release layer (no. 6 above). The primer was applied using a rod coating process. The first primer comprised an organosilane and a first catalyst comprised titanium, for example, an organic titanate or a titanium chelate.

In this example, the organosilane is an epoxysilane, for example, 3-glycidoxypropyl trimethoxysilane (available from ABCR GmbH & Co. KG, Im Schlehert 10 D-76187, Karlsruhe, Germany, product code SIG5840) and vinyltriethoxysilane (VTEO, available from Evonik, Kirschenallee, Darmstadt, 64293, Germany), vinyltriethoxysilane, an allyl silane or an unsaturated silane. The first catalyst for the silane condensation reaction was, for example, Tyzor® AA75 (available from Dorf-Ketal Chemicals India Private Limited Dorf Ketal Tower, D'Monte Street, Orlem, Malad (W), Mumbai-400064, Maharashtra, INDIA.). The primer was curable by, for example, a condensation reaction. The second catalyst was different from the first catalyst and, for example, comprises platinum. Karstedt catalyst with, for example, 9% platinum in solution (available from Johnson Matthey, 5th Floor, 25 Farringdon Street, London, EC4A 4AB, United Kingdom) or SIP6831.2 catalyst (available from Gelest, 11 East Steel Road, Morrisville, Pa. 19067, USA). This second catalyst was carried out by primer solution to be in contact with release layer and catalyze the addition cure reaction of release layer.

A silicone release formulation was provided on the primer layer. A rod coating process was used. The substrate (ACM) was uncured at this time. In this example the silicone release formulation comprised a vinyl silicone mixture (bi functional vs500, multifunctional xpry 5000), a silicon hydride crosslinker, and a monofunctional vinyl silicone, as detailed in Table 2 above. The silicone release layer also comprised a catalyst comprising platinum, namely, a Karstedt-type catalyst or a Pt(O) complex with vinylsiloxane ligands; an inhibitor, for example, an acetylenic alcohol, tetramethyl-tetravinylcyclotetrasiloxane or tetramethyldivinyldisiloxane. After the coating process is complete, the whole blanket is placed in an oven at 120° C. for 1.5 h (for ACM uncured substrate).

A cross-section of this ITM is shown schematically in FIG. 3.

Example 1

Thermoplastic polyester polyurethane Elastollan® S 60 A (from BASF) was extruded at a temperature of 190° C. by using a Dr. Collin cast extruder. Films with a thickness of 60, 110, and 200 μm were produced, by using a chill roll calender unit consisting of three swivel-mounted temperature controlled rolls.

The film was thermally laminated at 120° C. (a temperature at which the film is tacky but not melted) onto the rubber-based conductive layer of the reference ITM (layer no. 3) of a substrate comprising layers 1, 2 and 3 as described for the reference ITM.

A cross-section of this ITM is shown schematically in FIG. 4.

In this figure, the layers are as follows:
30—Outer release layer comprising TPU (Elastollan® S 60 A)
26—Rubber based conductive layer (i.e. the same as layer 3 in the reference ITM)
25—Rubber based compressible layer (i.e. the same as layer 2 in the reference ITM)
24—Fabric based adhesive layer (i.e. the same as layer 1 in the reference ITM)
22—Metal ITM drum The layered structure provided was used as the blanket in an intermediate transfer member on an HP Indigo 7500 Digital Press. It was found to act successfully as an ITM in electrophotographic printing.

Example 2

A 60 μm thermoplastic film created as in Example 1 was used as an additional layer between layers 3 and 4 of the reference ITM blanket structure.

A soft compliant layer (the same as layer 4 above in the reference ITM) was laminated onto the layered structure with a 60 μm thick TPU layer produced in Example 1. (In other words, the TPU layer had first been laminated onto a rubber-based conductive layer (the same as layer 3 in the reference ITM) of a substrate containing layers 1, 2 and 3 as described for the reference ITM). A primer layer (the same as layer 5 in the reference ITM) was gravure coated onto the layer 4, and then a silicone release layer was gravure coated onto the primer layer. The whole blanket was placed in an oven at 120° C. for 1.5 hours to cure the ITM.

A cross-section of this ITM is shown schematically in FIG. 5. In this figure, the layers are as follows:
30—Outer release layer comprising silicone (i.e. the same as layer 6 in the reference ITM)
28—Primer layer (i.e. the same as layer 5 in the reference ITM)
27—Rubber based soft compliant layer (i.e. the same as layer 4 in the reference ITM)
31—Layer comprising TPU (Elastollan® S 60 A)
26—Rubber based conductive layer (i.e. the same as layer 3 in the reference ITM)

25—Rubber based compressible layer (i.e. the same as layer 2 in the reference ITM)
24—Fabric based adhesive layer (i.e. the same as layer 1 in the reference ITM)
22—Metal ITM drum The layered structure provided was used as the blanket in an intermediate transfer member on an HP Indigo 7500 Digital Press. It was found to act successfully as an ITM in electrophotographic printing.

Example 3

TPSiV® 4200-70A thermoplastic elastomer (from Dow Corning) was extruded at a temperature of 200° C. by using a Dr. Collin cast extruder. TPSiV® 4200-70A is a thermoplastic elastomer comprising fully cross-linked silicone rubber dispersed within the thermoplastic polyurethane continuous phase. Films with a thickness of 250 and 500 µm were produced, by using a chill roll calender unit consisting of three swivel-mounted temperature controlled rolls.

The film was thermally laminated at 170° C. onto the 60 µm thick TPU layer of the structure produced in Example 1.

A cross-section of this ITM is shown schematically in FIG. 6. In this Figure is shown:

30—Outer release layer comprising thermoplastic polyurethane having particles of silicone dispersed therein (TPSiV® 4200-70A)
31—Compliant layer comprising TPU (Elastollan® S 60 A)
26—Rubber based conductive layer (i.e. the same as layer 3 in the reference ITM)
25—Rubber based compressible layer (i.e. the same as layer 2 in the reference ITM)
24—Fabric based adhesive layer (i.e. the same as layer 1 in the reference ITM)
22—Metal ITM drum The layered structure provided was used as the blanket in an intermediate transfer member on an HP Indigo 7500 Digital Press. It was found to act successfully as an ITM in electrophotographic printing.

Example 4

Thermoplastic polyester polyurethane Elastollan® soft 45 A 12 P 000 (from BASF) was extruded at a temperature of 190° C. onto the rubber-based conductive layer of the reference ITM (layer no. 3) of a substrate comprising layers 1, 2 and 3 as described for the reference ITM, and immediately transferred to a calender unit, which was operated at the temperature range of 150-200° C., at a speed of 8 rpm and a pressure of 70 bar. A TPU layer of various thickness from 50 to 400 µm was obtained. The layered structure is as shown in FIG. 4.

The layered structure provided was used as the blanket in an intermediate transfer member on an HP Indigo 7500 Digital Press. It was found to act successfully as an ITM in electrophotographic printing.

While the liquid electrophotographic printing apparatus, intermediate transfer members and related aspects have been described with reference to certain examples, those skilled in the art will appreciate that various modifications, changes, omissions, and substitutions can be made without departing from the spirit of the disclosure. It is intended, therefore, that the present method and related aspects be limited only by the scope of the following claims. The features of any dependent claim can be combined with the features of any of the other dependent claims or independent claims.

The invention claimed is:

1. An intermediate transfer member for liquid electrophotographic printing, the intermediate transfer member comprising at least one layer comprising a thermoplastic polyurethane, wherein the thermoplastic polyurethane is a polyester polyurethane made by reacting at least one polyester polyol intermediate with at least one diisocyanate and at least one chain extender.

2. The intermediate transfer member according to claim 1, comprising a layer comprising electrically conductive particles.

3. The intermediate transfer member according to claim 1, wherein at least one of the at least one layer comprising a thermoplastic polyurethane is present as an outer layer on the intermediate transfer member and has particles comprising a silicone dispersed within the thermoplastic polyurethane.

4. The intermediate transfer member according to claim 1, wherein the thermoplastic polyurethane has a Shore A hardness value less than or equal to about 80.

5. The intermediate transfer member according to claim 1, wherein the thermoplastic polyurethane has a Shore A hardness value greater than or equal to about 20.

6. The intermediate transfer member according to claim 1, wherein the intermediate transfer member comprises a compressible layer, and an outer release layer, and wherein at least one of the compressible layer, and the outer release layer comprises or is the at least one layer comprising a thermoplastic polyurethane.

7. An intermediate transfer member for liquid electrophotographic printing, the intermediate transfer member comprising at least one layer comprising a thermoplastic polyurethane, wherein the intermediate transfer member comprises, in the following order:
   a. a fabric layer;
   b. a compressible layer, which may have voids therein;
   c. a layer comprising electrically conductive particles;
   d. an optional compliant layer; and
   e. an outer release layer;
   wherein at least one of the compressible layer, the layer comprising electrically conductive particles, the optional compliant layer, and the outer release layer comprises the at least one layer comprising a thermoplastic polyurethane.

8. A liquid electrophotographic printer comprising:
   a photoimaging plate; and
   an intermediate transfer member comprising at least one layer comprising a thermoplastic polyurethane, the intermediate transfer member being, in use, to transfer electrophotographic ink from the photoimaging plate to a print substrate;
   wherein the thermoplastic polyurethane is a polyester polyurethane made by reacting at least one polyester polyol intermediate with at least one diisocyanate and at least one chain extender.

9. A method of forming an intermediate transfer member for liquid electrophotographic printing, the method comprising associating a plurality of layers to form the intermediate transfer member, at least one of the layers comprising a thermoplastic polyurethane;
   wherein the at least one of the layers comprising a thermoplastic polyurethane is associated with at least one of the plurality of layers by heat lamination, direct extrusion coating, or calendering.

10. A method of forming an intermediate transfer member for liquid electrophotographic printing, the method comprising associating a plurality of layers to form the intermediate transfer member, at least one of the layers comprising a thermoplastic polyurethane;

wherein the association of the layer comprising a thermoplastic polyurethane is performed at a temperature above about 115° C.

11. The method according to claim 10, wherein the association of the layer comprising a thermoplastic polyurethane is performed at a temperature below about 190° C.

* * * * *